(12) United States Patent
Rauch et al.

(10) Patent No.: US 7,033,640 B2
(45) Date of Patent: Apr. 25, 2006

(54) METHOD OF COLORING CUT GEMSTONES

(75) Inventors: Thomas Rauch, Innsbruck (AT); Martin Würtenberger, Axams (AT)

(73) Assignee: D. Swarovski & Co, Wattens (AT)

( * ) Notice: Subject to any disclaimer, the term of this patent is extended or adjusted under 35 U.S.C. 154(b) by 347 days.

(21) Appl. No.: 10/317,040

(22) Filed: Dec. 12, 2002

(65) Prior Publication Data

US 2003/0124299 A1 Jul. 3, 2003

(30) Foreign Application Priority Data

Dec. 27, 2001 (AT) ............... A 2036/2001

(51) Int. Cl.
*C23C 16/00* (2006.01)
*B05D 3/02* (2006.01)

(52) U.S. Cl. ............. 427/229; 427/593; 427/250

(58) Field of Classification Search ............. 427/250, 427/255.19, 255.23, 593, 592, 229, 226, 427/591, 546, 545
See application file for complete search history.

(56) References Cited

U.S. PATENT DOCUMENTS

| 3,805,124 | A | * | 4/1974 | Nagasawa et al. | ............ 338/15 |
| 4,061,549 | A | * | 12/1977 | Hazelrigg et al. | .......... 205/535 |
| 5,791,237 | A | * | 8/1998 | Gibson | .......... 99/510 |
| 5,888,918 | A | * | 3/1999 | Pollak | .......... 501/86 |

OTHER PUBLICATIONS

Coughlin, Donald G., Sri Lanka—A Gemstone Buyer's Dream, Gemology World—Canadian Institute of Gemmology, 1995.*

* cited by examiner

Primary Examiner—Timothy Meeks
Assistant Examiner—Eric B. Fuller
(74) Attorney, Agent, or Firm—Wenderoth, Lind & Ponack, L.L.P.

(57) ABSTRACT

A method of coloring cut gemstones introduces metals or metal oxides into a surface layer by means of heat treatment. During the heat treatment the gemstones are laid on a solid plate and the metals or metal oxides form a substantial constituent of the plate. The surface of the gemstone is protected from direct content with the metals and metal oxides in the plate by a layer containing non-coloring oxides.

19 Claims, 1 Drawing Sheet

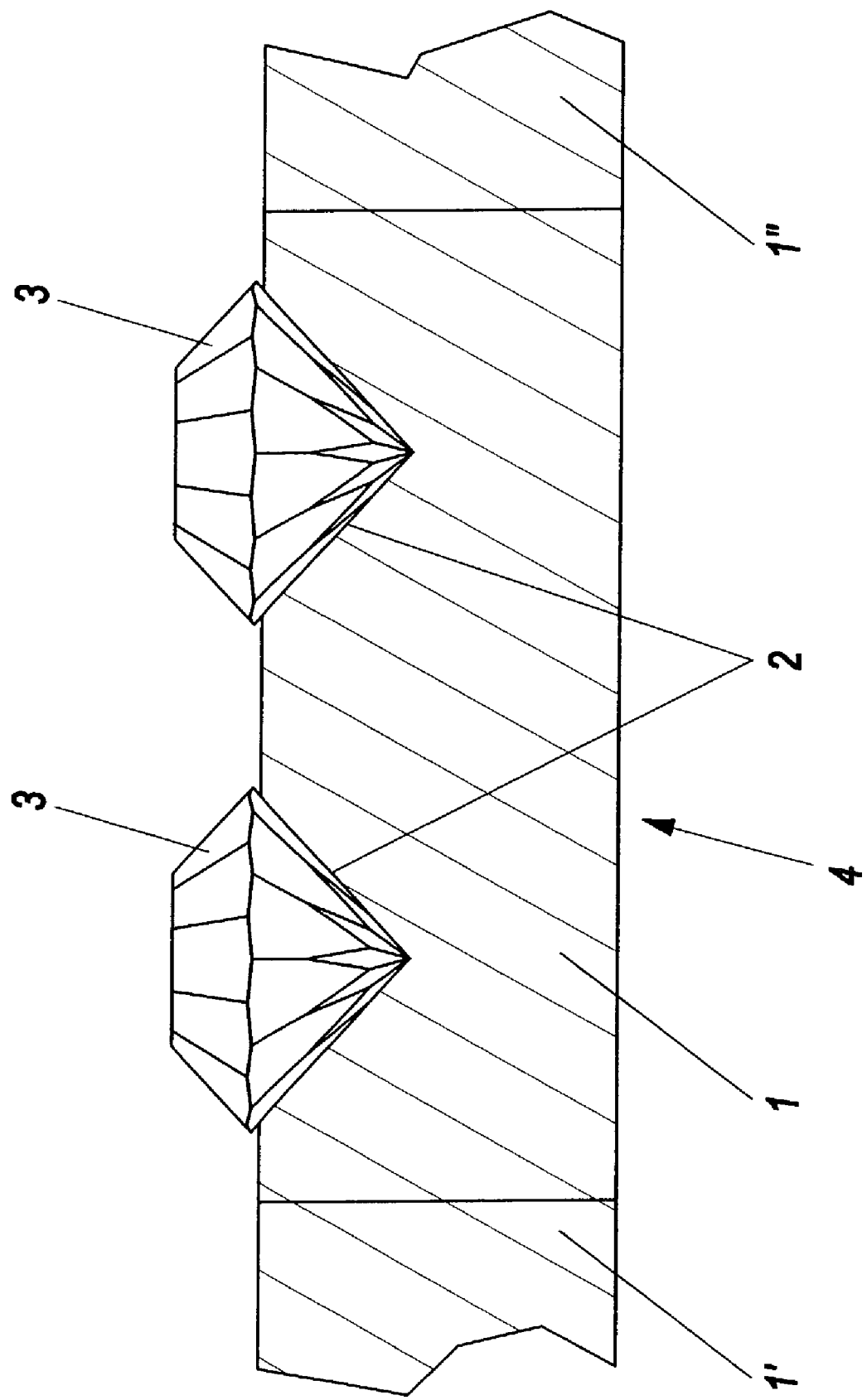

METHOD OF COLORING CUT GEMSTONES

BACKGROUND OF THE INVENTION

The invention relates to a method of coloring cut gemstones by introducing metals or metal oxides into a surface layer by means of heat treatment.

Surface coloring of gemstones with transition metals is a procedure which has been repeatedly described since early times. In more recent times endeavours in particular have been made to reduce the temperature involved in the heat treatment in order to be kind to the surface of the stones. That was achieved for example by a procedure whereby the cut stones were not vapor deposited with cobalt oxide alone but with cobalt in combination with aluminum oxide (see DE-A-22 29 909). Balitskii (see U.S. Pat. No. 3,950,596) stated that not all oxides have to be applied to a polished gemstone but it is possible to use the stone itself as one of the reactants. Surface coloring can therefore be effected both by diffusion and also by reaction.

A series of important minerals which are used for gemstones are suitable for the coloring effect. Besides corundum these are inter alia the various spinels, the island silicates olivine, zircon, topaz and garnet, the aluminosilicates such as andalusite, disthene or mullite, and the ring silicates beryl and cordierite which can all react with cobalt.

The difficulty with all these diffusion and reaction methods lies in the way in which the reactants are brought together and the way in which the reaction is controlled in respect of temperature and time in such a way that the polished surface of the stones is not damaged.

A first variant of the method involves bringing the stones into close contact with metal or metal oxide powder and heating them. That suffers from the disadvantage that the partially poisonous metals or metal oxides have to be handled. The stones first have to be carefully embedded. The procedure involves using suitable dishes for the metal oxides, and they take up a very great deal of furnace space. The stones have to be cleaned after the treatment and the coloring substances used have to be processed in an expensive manner in view of the environmental protection aspects in order to be able to use them further. The risk of stones being damaged is also great due to the cleaning operation involved.

The alternative method of applying metals or metal oxides to gemstones by vapor deposition or sputtering is substantially cleaner. The disadvantage here is that the procedure is a two-stage process. After the coating operation the coated stones have to be extremely cleanly stored as even just very slight impurities prior to the thermal treatment can result in burning-in phenomena when the treatment is carried out.

Both methods have a common disadvantage: they frequently involve direct solid-body reactions which do not take place uniformly on the entire surface to be colored. That also results in local damage to the polish.

BRIEF SUMMARY OF THE INVENTION

To avoid those disadvantages the invention provides that in the heat treatment the gemstones are placed on a solid plate and the metals or metal oxides form a substantial constituent of the plate.

Therefore a sieve plate or hole-bearing plate is made from metal or metal oxide which for a substantial part comprises coloring materials. The sieve plate has recesses in the shape of the lower part of the stones. When the stones are sieved out on the plate the pavilion or the pavilion and the girdle disappear in the sieve plate, and only the upper part peeps out. Usually a respective specific sieve plate is made for each size of stone, but it is also possible to treat smaller stones in a plate intended for larger stones and larger stones in a plate intended for smaller stones. In particular the plate can be provided with a cover of the same composition in order entirely to enclose the stones.

The cut, and usually also polished, stones are sieved on to the sieve plates. The individual sieve plates are stacked in the furnace and the treatment program started. With cobalt oxides, it is possible to operate at atmospheric pressure and with a furnace atmosphere which is not specified in greater detail. For other oxides, such as for example iron oxides, a reducing atmosphere is usually employed. With some materials a reduced pressure may also be advantageous. As soon as the furnace is cooled down again the stones are tipped out of the sieve plate. There is no need for the stones to be cleaned. Burning-in phenomena as occur with the two alternative methods referred to hereinbefore can be very well avoided by virtue of the configurational options which a sieve plate offers and which are not possible with the foregoing methods.

The avoidance of unwanted solid-body reactions is firstly possible in accordance with the invention by virtue of the fact that the contact between gemstone and plate is restricted to the periphery of the stone, insofar as it is provided that the recesses in the plate are more acutely angled than the gems. A better fit for the stones is achieved if the recesses in the plate, which receive the facetted pointed underside of the gems, are conical. Here the contact between the stone and the plate is limited to the lower edges of the stone.

A coloring sieve plate affords a further possible way of making the diffusion or reaction between the stone and the coloring element more homogeneous, which is not available with the known methods. Thus it is very simple to provide on the sieve plate an additional diffusion layer which can be virtually as thin as may be desired and which prevents direct, frequently destructive contact between the coloring metal/metal oxide and the stone to be colored. That additional diffusion layer remains during the entire service life of the plate on the surface at which the coloring element is consumed and, with increasing consumption of coloring material for the stones to be colored, only sinks deeper into the plate.

The following method presents itself for producing that protective layer:

The sieve plate is made not only from the coloring oxides, but a small proportion, usually between 3 and 10%, of a non-coloring oxide, is introduced. One or more oxides are selected which are also contained in the gemstone to be colored. After the sieve plate has been produced, it is conditioned. A non-coloring oxide powder comprising the same oxide which is contained in the sieve plate is put into the recesses of the sieve plate. The sieve plate is then heated over a prolonged period of time to a temperature somewhat above the temperature of use of the sieve plate. Due to the conditioning operation, a thin diffusion layer is in turn formed therefrom, which prevents direct reaction and damage to the polish of the gemstone.

BRIEF DESCRIPTION OF THE DRAWINGS

A cross-section through a sieve plate according to the invention is diagrammatically shown in the drawing (gemstones not in section).

DETAILED DESCRIPTION OF A PREFERRED EMBODIMENT OF THE INVENTION

A plate 4 is made up, for reasons relating to the operating procedure of the method, from a plurality of segments 1, 1', 1" provided with recesses 2 for receiving gemstones 3. The surface of the recesses is provided with a thin protective layer (of the order of magnitude of some μ) which prevents direct contact between the plate 4 and the stones 3.

In the illustrated embodiment of the plate 4, the gemstones 3 are colored only at the rear side. If there is a wish also to color the flat front portion (table), the gemstones 3 can be packed sandwich-like between the illustrated plate and a further, cover-like plate which has recesses corresponding to the top side of the gemstones 3.

Gemstones which have a flat underside (roses) can also be refined with the method according to the invention.

Three examples of the manufacture and use of the illustrated plate are set forth hereinafter:

EXAMPLE 1

Manufacture of a cobalt oxide sieve plate ceramically, in which a diffusion layer of cobalt spinel is formed by a conditioning operation and during use:

25 g of cobalt oxide is mixed with 25 g of gamma aluminum oxide dry in a planet mill. The mixture is calcined in an aluminum oxide pot for 6 hours at 100° C. The calcined powder mixture is subjected to a mortaring operation and ground wet with 450 g of cobalt oxide powder in a planet mill for about 1 hour with 1.5 mm zirconium oxide grinding balls. 1.5% by weight of Hoechst wax C is added to the dried powder. The mixture is well homogenised once again in a porcelain mortar.

For production of the female pressing die, the upper part is ground off finished-cut stones and the pavilion cone is stuck at a sufficient spacing on to the lower pressing ram of the die. The powder is introduced into the die. Between about 1.5 and 2 g of cobalt oxide mixture is used per square centimeter of die. The powder is pressed at between 500 and 1000 bars and the sieve plate segment ejected. The segments are freed of binder and sintered in one step. Small segments can be sintered in accordance with the following program: 1 hour at 900° C., 6 hours at 1000° C. and 12 hours at 1200° C.

The sintered segments are then conditioned. For that purpose dry gamma-aluminum oxide is loosely pressed into the recesses of the sieve plate segments and the sieve plate is heated to 900° C. rapidly in about 1 hour. The temperature is maintained for 3 hours. It is heated to 1200° C. in 50° C. steps. After cooling down in the furnace the excess aluminum oxide and loose spinel on the surface is brushed away. A plurality of segments are assembled to form a large plate.

White sapphire can be colored dark blue on a sieve plate produced in that way, in the following fashion: the ground and polished white sapphires are sieved on to the plate, the plate is heated to 800° C. in 1 hour and the temperature is maintained for 1 hour. The plate is heated to 1200° C. in 3 hours and the temperature maintained for 30 minutes. The plates with the stones are left to cool down in the furnace.

Topaz is colored with a similar program. The sieve plate with topaz is heated in the furnace to 800° C. in 1 hour and the temperature is maintained at 800° C. for 1 hour. The plate is further heated to 1100° C. in 3 hours and the temperature is held at 1100° C. for 1 hour.

Aluminosilicates can be treated in the same manner as topaz, with the same temperature program. If disthene is colored in accordance with the above program on the sieve plate, the frequently somewhat pallid natural blue coloration can be markedly improved.

EXAMPLE 2

Manufacture of a ceramic sieve plate of cobalt oxide with a thin diffusion layer of cobalt spinel.

50 g of cobalt oxide is ground as described above and mixed with Hoechst wax. A calcined 1:1 mixture of cobalt oxide and aluminum oxide is ground with benzene and 5% of isopropanol. The lower pressing ram with the cones glued thereon is well covered with that suspension. The layer may not be too thick as otherwise it chips off. As above, between 1.5 and 2 g of powder/cm$^2$ is introduced into the female die and the segments pressed. The segments are again slowly sintered and maintained at 1200° C. for 12 hours. The coloration of a sieve plate produced in that way is greater, with the same temperature program, than in the case of a plate produced in accordance with the above method. White sapphire, aluminosilicates, mullite and topaz were colored on a sieve plate produced in that manner, with the foregoing temperature program.

EXAMPLE 3

Manufacture of a sieve plate of $V_2O_5$:

For sieve plates of $V_2O_5$ the powdered oxide is simply mixed with Hoechst wax and the segments pressed. The segments are sintered at 650° C. The still porous segments are briefly dipped into an aqueous suspension with 5 percent by weight of very fine zirconium oxide (16 m$^2$/g) and then dried. The segments are sintered once again for 12 hours at 650° C. Using that plate, stones washed in dilute HCl of cubic zirconia can already be colored yellow at 650° C. in 12 hours.

The invention claimed is:

1. A method of coloring cut gemstones by introducing metal or metal oxide into a surface layer by heat treatment, wherein during the heat treatment the gemstones are laid on a solid plate and the metal or metal oxide forms a substantial constituent of the plate.

2. A method as set forth in claim 1 characterised in that the gemstone is topaz which is colored by cobalt or cobalt oxide.

3. A method as set forth in claim 2 characterised in that an outer protective layer of the plate comprises cobalt spinel.

4. A method as set forth in claim 1 wherein the surface of the stones is protected from direct contact with the metal or metal oxide in the plate by an outer layer of the plate containing non-coloring oxide.

5. A method as set forth in claim 4 wherein the gemstone is topaz which is colored by of cobalt or cobalt oxide.

6. A method as set forth in claim 5 characterised in that the outer layer comprises cobalt spinel.

7. A method as set forth in claim 4 characterised in that the non-coloring oxide is part of the natural composition of the gemstone.

8. A method as set forth in claim 7 wherein the gemstone is topaz which is colored by of cobalt or cobalt oxide.

9. A method as set forth in claim 8 characterised in that the outer layer comprises cobalt spinel.

10. A method of coloring cut gemstones by introducing metal or metal oxide into a surface layer by heat treatment, comprising:

laying the cut gemstones on a solid plate, the metal or metal oxide forming a substantial constituent of the plate; and performing heat treatment with the cut gemstones on the solid plate such that the metal or metal oxide is introduced into the surface layer of the cut gemstones.

11. The method of claim 10, wherein said laying comprises placing the cut gemstones in recesses in the plate.

12. The method of claim 10, wherein the cut gemstones are topaz and the metal or metal oxide is cobalt or cobalt oxide.

13. The method of claim 12, wherein the surface of the cut gemstones is protected from direct contact with the metal or metal oxide in the plate by an outer layer of the plate comprising cobalt spinel.

14. The method of claim 10, wherein the surface of the cut gemstones is protected from direct contact with the metal or metal oxide in the plate by an outer layer of the plate containing non-coloring oxide.

15. The method of claim 14, wherein the cut gemstones are topaz and the metal or metal oxide is cobalt or cobalt oxide.

16. The method of claim 15, wherein the outer layer of the plate comprises cobalt spinel.

17. The method of claim 14, wherein the non-coloring oxide is the same as a part of the natural composition of the gemstone.

18. The method of claim 17, wherein the cut gemstones are topaz and the metal or metal oxide is cobalt or cobalt oxide.

19. The method of claim 18, wherein the outer layer of the plate comprises cobalt spinel.

* * * * *